2 Sheets—Sheet 1.

J. S. SAVAGE.

Registering Ballot-Boxes.

No. 8,535. Reissued Jan. 7, 1879.

Witnesses

E. E. Masson.

E. A. Dick

Inventor:

James S. Savage by A. Pollok his attorney

N. PETERS, PHOTO-LITHOGRAPHER, WASHINGTON, D. C.

J. S. SAVAGE.
Registering Ballot-Boxes.

No. 8,535. Reissued Jan. 7, 1879.

*Witnesses:*

E. E. Masson

E. J. Dick

*Inventor:*

James S. Savage by A. Pollok his attorney.

N. PETERS, PHOTO-LITHOGRAPHER, WASHINGTON, D. C.

UNITED STATES PATENT OFFICE

JAMES S. SAVAGE, OF NEWTON, MASSACHUSETTS.

IMPROVEMENT IN REGISTERING BALLOT-BOXES.

Specification forming part of Letters Patent No. 142,124, dated August 26, 1873; Reissue No. 8,535, dated January 7, 1879; application filed November 21, 1878.

*To all whom it may concern:*

Be it known that I, JAMES S. SAVAGE, formerly of Kingston, in the county of Rockingham and State of New Hampshire, now of Newton, in the county of Middlesex and State of Massachusetts, have invented certain Improvements in Ballot-Boxes, of which the following is a full, clear, and exact description, reference being had to the accompanying drawings, making part of this specification, in which—

Figure 1:
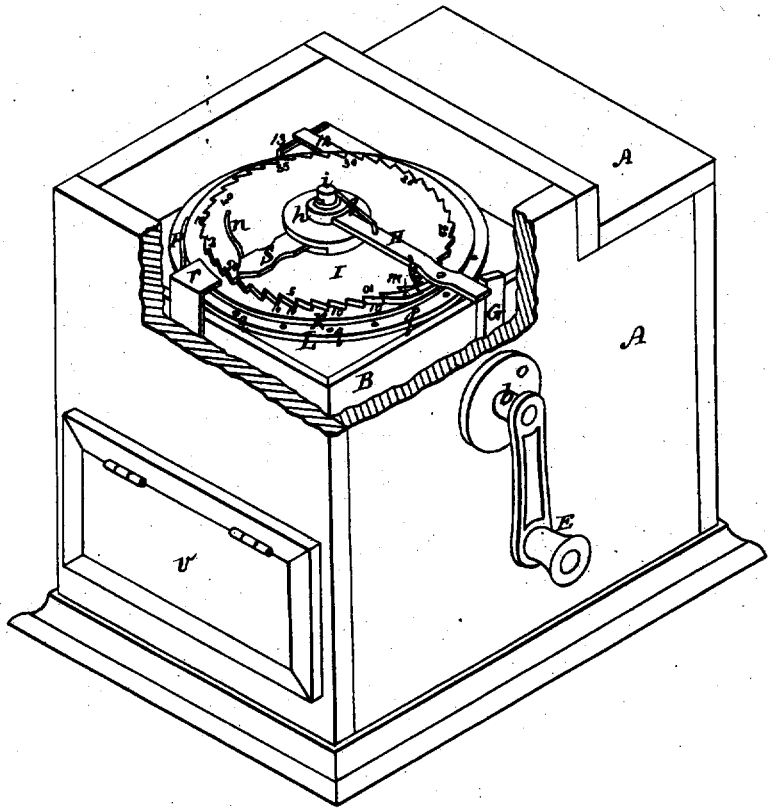
Figure 2:
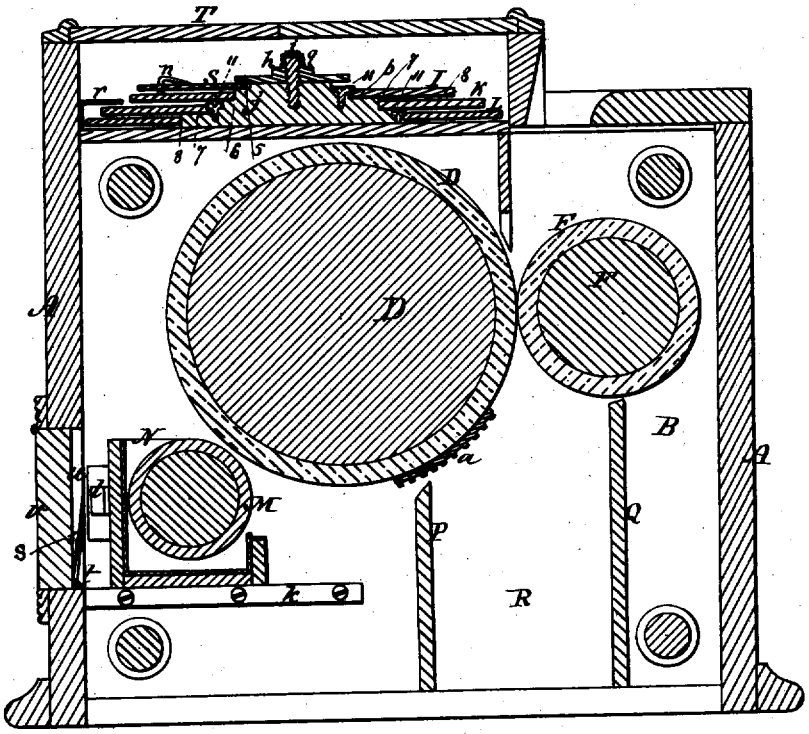
Figure 3:
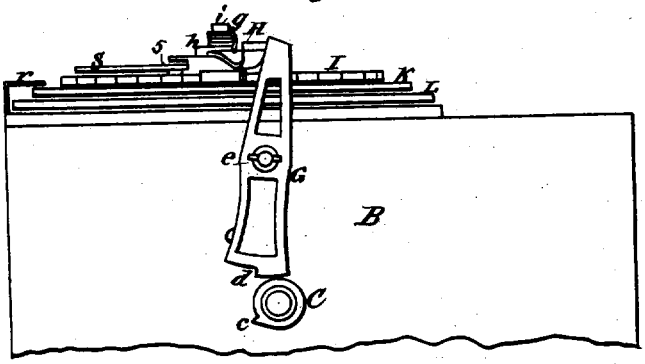

Figure 1 is a perspective view of a ballot-box constructed in accordance with my invention. Fig. 2 is a vertical longitudinal section through the center of the same. Fig. 3 is a side elevation, representing a portion of my invention.

To prevent the possibility of fraud in depositing and counting votes where ballot-boxes are employed is the object of my invention, which consists in combining with the ballot-box, which is or may be of any ordinary or suitable construction, a marking device so operated that every vote properly deposited shall be stamped or marked, indicative of its genuine and lawful character.

My invention further consists in the combination, with a ballot-box, of a marking-cylinder provided with an external crank and a pressure-roller so arranged at or near the mouth of the box that no vote can be deposited without the rotation of the said cylinder; thirdly, in the combination, with the ballot-box and marking or printing device and pressure-roller, arranged at or near the mouth thereof, of an inking device; and, fourthly, in the combination, with a ballot-box and a marking device, of an apparatus for registering or counting, operating in connection with the canceling device, to serve as an additional check on fraudulent voting, as hereinafter more fully set forth.

By the use of my invention the votes, as they are cast one by one, will each be stamped or marked and registered on the dial of the counting apparatus; but in the event of two or more votes being entered at once by the same voter, only one of the votes will be stamped or registered, thus enabling the inspector to readily discover any vote or votes which may be fraudulently entered and do not bear the required mark, the cylinder and registering mechanism being placed within a suitable frame inclosed in a box attached to the top or side of the receptacle in which the votes are deposited.

To enable others skilled in the art to understand and use my invention, I will proceed to describe the manner in which I have carried it out.

In the drawings, A is a box or casing inclosing a frame, B, in bearings in the sides of which is hung the shaft C of a cylinder, D, provided with a type-plate, *a*. The shaft of this cylinder is made hollow, and extends through the frame B, the outer end of the shaft being provided with a screw-thread for the reception of the end of a crank, *b*, operated by a handle, E.

The outer end of the shaft does not extend outside the box A, but is accessible, to connect the crank therewith, by means of a circular opening therein.

When the crank is in place and turned from the operator the cylinder is revolved; but when turned toward him it may be disconected therefrom without revolving it.

F is a pressure-roller, the shaft of which has its bearings in the sides of the frame B, the periphery of the roller being placed in contact with the periphery of the cylinder D, in order that it may be revolved thereby.

The pressure-roller and marking device are located at or near the mouth of the box in which the ballots are deposited, so that the ballots cannot be deposited without revolving the marking-cylinder, and must be passed between the pressure-roller and the said cylinder, and in contact with the type-plate to be marked thereby.

When two or more ballots are deposited at the same time, one only of said ballots comes into contact with the type-plate, and one only is marked as genuine.

The portion of the shaft C which extends outside the frame B is provided with an enlargement having a projection, *c*, which engages with a projection, *d*, formed on the lower end of a lever, G, pivoted, at *e*, to the outside of the frame, the upper end of this lever engaging with an arm, H, extending out from a circular plate, *h*, fitting loosely over a vertical pin, *i*, as its center, this pin being screwed into a solid circular piece, *j*, cut away so as to form a series of flat concentric surfaces, 5 6 7 8, which serve as bearings for three circular graduated disks, I K L, the pin *i* being the common center around which they are made to turn when the lever G is thrown against the arm H by the revolution of the shaft of the cylinder D, a spring, 9, being employed for returning the arm H to its normal position when the lever ceases to act thereon.

The type-plate *a* on the cylinder D is supplied with ink by means of a roller, M, which is revolved by the friction of the type-plate *a* therewith.

The shaft of this inking-roller M has its bearings in a frame, N, which fits within the frame B and rests on cleats *k*, secured to its inner sides, being kept in position by catches *l*, entering recesses therein. In the bottom of this frame N is formed a receptacle for containing a sponge, to be saturated with ink, to be laid on the roller M, and thence to be distributed to the type-plate on the cylinder B.

Beneath the cylinder D is a vertical partition, P, and beneath the roller F is a vertical partition, Q, between which is formed a compartment or chamber, R, into which the votes are conducted after successively passing through the cylinder and roller, and receiving the printed impression from the type-plate *a*. From this chamber R the votes fall into a receptacle, (not shown,) in which they are finally deposited for examination by the inspector, the frame B and its box A being attached to the top or side thereof.

The upper surface of the disk I is graduated, near its periphery, into fifty equal spaces, which are marked with their respective numbers, and the outer surface or rim of this disk is provided with a corresponding number of notches, 10, into which engages a spring-pawl, *m*, pivoted to the arm H.

S is a stationary index or pointer, secured to the surface or bearing 5 of the circular central piece, *j*, immediately under the central portion, *h*, of the arm H.

To the upper surface of the disk I is secured one end of a bent spring, *n*, of the form seen, the other end of this spring being placed directly over a small circular opening therein, this opening being situated immediately over a line of similar openings made in the disk K, by which construction, just previous to the disk I having made fifty partial revolutions, and just previous to having completed one entire revolution, the outer end of the spring is brought under the index S, and is thereby depressed, causing the spring to enter one of the openings in the disk K, the number of those openings corresponding to the number of graduations thereon.

The outer periphery of the disk K is provided with a spring, *p*, the outer end of which is situated directly above a row of openings, *q*, in the disk L similar to those in the disks I and K, and a stationary cleat, *r*, projects over this row of openings *q*, in order that just before the disk K has made separate and distinct partial revolutions corresponding to the number of its graduations, and just previous to completing one entire revolution, this spring *p* will be depressed by the cleat *r* into one of the openings *q*, and carry the disk L around a portion of a revolution corresponding to one of its graduations.

The inner edge of the upper surface of each disk over its bearings is slightly cut away, in order that screws 11, passing into these bearings, may be turned down on these edges with sufficient friction to insure the simultaneous turning of two disks, when the spring of the upper one passes under the stationary index S or cleat *r*.

The frame B, when properly placed within its box or casing A, is held in position therein by buttons 12, turned over strips 13, secured near the top of the inside of the frame B, and by bent springs *s*, near the lower end of two of its opposite sides, resting on a portion, *t*, of the box, forming the bottom of an opening, *u*, controlled by a door or lid, *v*, and through which access is had to the inking-roller M. The top of the box A is provided with a plate of glass, which serves as a window, T, through which to view the registering apparatus.

From the foregoing it will be seen that the votes, when entered one by one, will be properly marked by the type-plate *a* as they are successively brought in contact therewith; but in the event of two or more votes being entered at once by the same individual, only one of the votes will be marked, and but one registered on the dial, thus enabling the inspector to readily discover any vote or votes not stamped, which have been fraudulently entered.

Having described my invention, what I claim, and desire to secure by Letters Patent, is—

1. The combination, with a ballot-box, of a marking device so operated that every vote properly deposited shall be stamped or marked indicative of its genuine and lawful character, substantially as described.

2. The combination, with a ballot-box, of a marking-cylinder provided with an external operating-crank and a pressure-roller so arranged at or near the mouth of the box that no vote can be deposited without the rotation of said cylinder, substantially as described.

3. The combination, with a ballot-box, of a marking device, pressure-roller, and inking device, substantially as described.

4. The combination, with a ballot-box, of a canceling device and registering or counting apparatus, substantially as described.

In testimony whereof I have hereunto signed my name this 19th day of November, A. D. 1878.

JAMES S. SAVAGE.

Witnesses:

EDWIN O. CHILDS,

R. L. HINDS.